(12) United States Patent
Brugiolo et al.

(10) Patent No.: US 8,108,799 B2
(45) Date of Patent: Jan. 31, 2012

(54) REMOTING OF WINDOWS PRESENTATION FRAMEWORK BASED APPLICATIONS IN A NON-COMPOSED DESKTOP

(75) Inventors: Ivan Brugiolo, Redmond, WA (US); Leonardo Blanco, Redmond, WA (US); Nadim Abdo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 961 days.

(21) Appl. No.: 11/694,510

(22) Filed: Mar. 30, 2007

(65) Prior Publication Data

US 2008/0244458 A1 Oct. 2, 2008

(51) Int. Cl.
*G06F 3/048* (2006.01)
(52) U.S. Cl. ......... 715/853; 715/740; 715/746; 715/747
(58) Field of Classification Search .................. 715/853
See application file for complete search history.

(56) References Cited

U.S. PATENT DOCUMENTS

| | | | |
|---|---|---|---|
| 6,237,092 B1 | 5/2001 | Hayes, Jr. | |
| 7,088,374 B2 | 8/2006 | David et al. | |
| 7,117,448 B2 | 10/2006 | Cooper et al. | |
| 2004/0095382 A1 | 5/2004 | Fisher et al. | |
| 2004/0189677 A1 | 9/2004 | Amann et al. | |
| 2005/0021756 A1 | 1/2005 | Grant | |
| 2005/0088436 A1* | 4/2005 | Swedberg et al. | 345/420 |
| 2005/0125739 A1 | 6/2005 | Thompson et al. | |
| 2005/0140694 A1 | 6/2005 | Subramanian et al. | |
| 2006/0230105 A1 | 10/2006 | Shappir et al. | |
| 2006/0230156 A1 | 10/2006 | Shappir et al. | |
| 2006/0248112 A1 | 11/2006 | Williams et al. | |
| 2006/0248451 A1 | 11/2006 | Szyperski et al. | |
| 2007/0052723 A1 | 3/2007 | Subramanian et al. | |

OTHER PUBLICATIONS

"Windows Vista Rules for Enabling windows Aero," Microsoft Corporation, Nov. 2006.*
Andrew Troelsen, "Introduction to Windows Presentation Foundation," 2006.*
"Windows Vista Rules for Enabling Windows Aero", available at least as early as Feb. 12, 2007, at <<http://download.microsoft.com/download/9/c/5/9c5b2167-8017-4bae-9fde-d599bac8184a/aero_rules.doc>>Microsoft Corporation, 2006, pp. 1-21.
The Chinese Office Action mailed Jan. 12, 2011 for Japanese Patent Application No. 200880010279.4, a counterpart foreign application of U.S. Appl. No. 11/694,510.

* cited by examiner

*Primary Examiner* — William Bashore
*Assistant Examiner* — Daniel Um
(74) *Attorney, Agent, or Firm* — Lee & Hayes, PLLC (57) ABSTRACT

Described are systems and methods for remoting applications, such as those based on Windows® Presentation Foundation (WPF). The systems and methods are based on remoting information associated with a structural representation. The structural representation corresponds to visual contents or elements of a desktop to be displayed at a remote end or client end, without rendering the contents at a client or remoted end. The information associated with the structural representation or structural information includes data that specifies the placement of the visual contents on the desktop when displayed. The information is used for recreating the structural representation at the client end and displaying the visual contents in conformance with the structural representation.

15 Claims, 7 Drawing Sheets

REMOTING OF WINDOWS PRESENTATION FRAMEWORK BASED APPLICATIONS IN A NON-COMPOSED DESKTOP

BACKGROUND

In certain operating systems, a final visual representation of a desktop that runs applications on a computing-based device is the result of a composition. Composition is the process by which various visual components are represented on a visualization device. The visualization device can be a monitor. The desktop is a logical abstraction of the visualization device. The process of composing a desktop includes creating a structural representation of the various visual components and associating attributes, for example color, location on desktop, with them and then displaying the content in conformance with the structural representation. The process of composition can be utilized by other computer based applications. An example of such computer based applications that implement composition of visual content or elements includes Windows® Presentation Foundation (WPF) applications.

When remoting, the desktop is fully composed and then is remoted to a client or a user end. Transfer of data in relation to the desktop after the composition process results in improper utilization of network resources thus making the remoting process inefficient and slow.

SUMMARY

This summary is provided to introduce concepts relating to remoting of applications, such as applications based on Windows® Presentation Foundation (hereinafter referred to as WPF). These concepts are further described below in the detailed description. This summary is not intended to identify essential features of the claimed subject matter, nor is it intended for use in determining the scope of the claimed subject matter in an embodiment.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Systems and methods for remoting applications, such as those based on Windows® Presentation Foundation (WPF) are described. The systems and methods are based on remoting information associated with a structural representation. The structural representation corresponds to visual contents or elements of an application or the desktop. The structural representation allows the application to be displayed at a remote end or client end, without rendering the contents at a remoted end. The information associated with the structural information includes data that specifies the placement of the visual contents on the desktop when displayed. The structural information includes also the description of the relationship between the portions of a window rendered via the visual tree (associated with the structural representation) and the portions of the window to be rendered by a default common system component such as a window manager agent. The structural information is used for recreating the structural representation at the client end and displaying the visual contents in conformance with the structural representation. In one implementation, the structural information is made by the knowledge of the location of specific render target in relation to a desktop. In one implementation the structural representation can be a visual tree.

To this end, the system provides for remoting the structural information from a remote end to a client end. The structural information is used to correctly locate visual content generated by a one or more visual trees and the content rendered by a default common system component such as the window manager agent.

To this end, the system provider for remoting the structural representation from a remote end to a client end, the structural representation is used for the regeneration of the structural representation (e.g., visual tree). The system enables rasterization and rendering of the visual contents on the client end in conformance with the structural representation.

A system may include one or more computer programs or agents that can affect the remoting of structural information corresponding to a desktop from a remote end to the client end. The agent relates one or more visual contents of the desktop that are to be displayed, and generates a corresponding structural representation (e.g., a visual tree). The structural representation related to structural information providing attributes that determine the visual character of the visual contents when displayed. The agent at the remote end may also note any changes in the structural representation and makes the corresponding changes to the structural representation generated at the client end. The modified structural representation can then be used for displaying visual contents accordingly. In an implementation, the remote end is a server computing device hosting one or more computing-based applications or programs.

While aspects of described systems and methods for remoting WPF based applications on a non-composed desktop without also composing the desktop can be implemented in any number of different computing systems, environments, and/or configurations, the embodiments are described in the context of the following exemplary system architecture(s).

An Exemplary System

Figure 1:
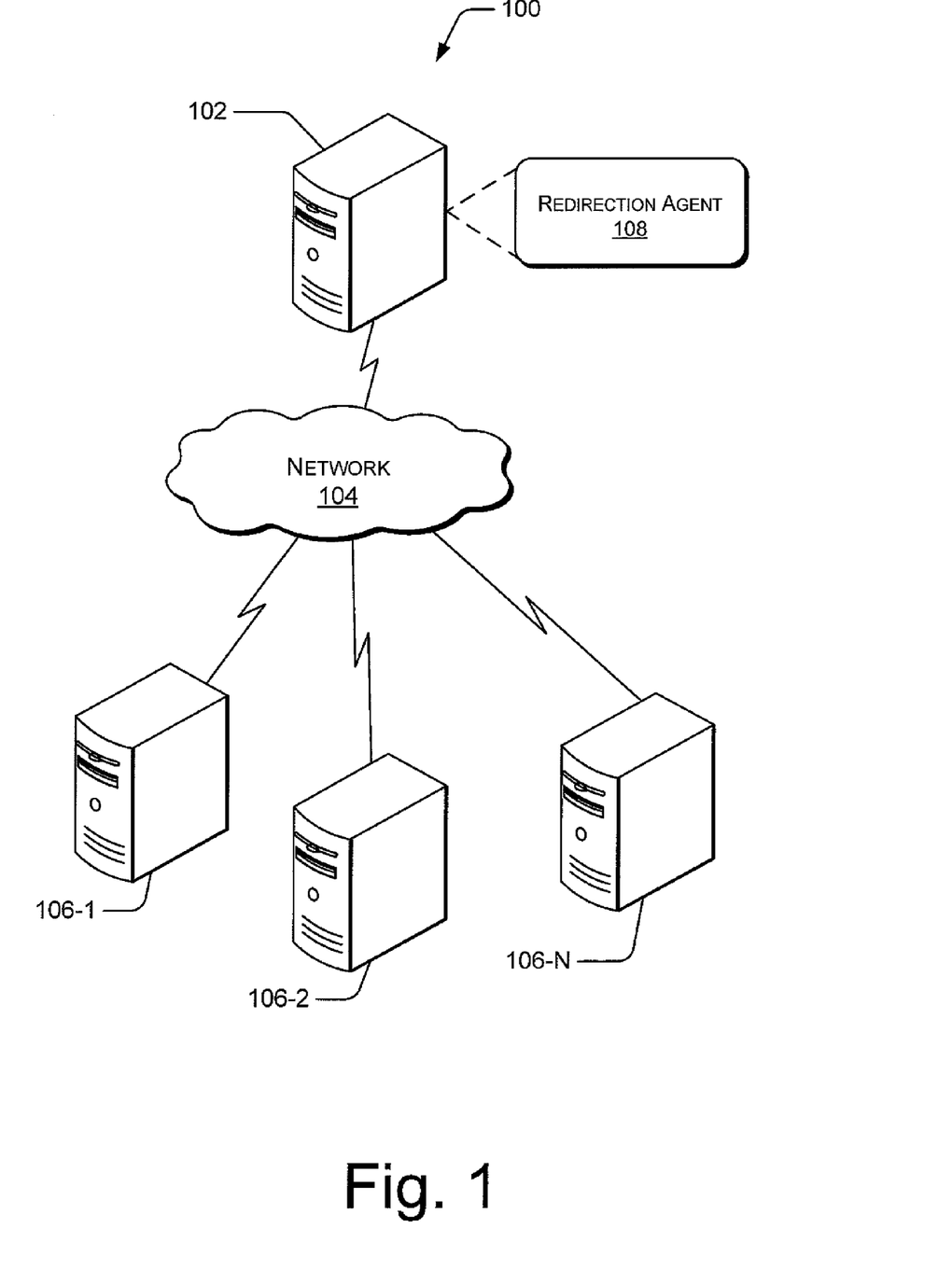
FIG. 1 illustrates an exemplary system implementing remoting of applications based on Windows® Presentation Foundation in a non-composed desktop.

FIG. 1 shows an exemplary system 100 for remoting applications based on Windows® Presentation Foundation (WPF) applications on a non-composed desktop. To this end, the system 100 includes a server computing device 102 communicating through a network 104 with one or more client computing devices 106(1)-(N). For example, in one implementation, system 100 can be a company network, including thousands of office PCs, various servers, and other computing-based devices spread throughout several countries. Alternately, in another possible implementation, system 100 can include a home network with a limited number of PCs belonging to a single family.

System 100 may include, or be similar to, a Terminal Service™ system by the Microsoft® Corporation, wherein the multiple client computing devices 106 access applications installed or hosted on server computing device 102. Therefore client computing devices 106 wishing to access applications hosted on server computing device 102 interact with the application through a Windows® interface. The Windows® interface displayed at the client end replicates the desktop environment that would be rendered on server computing device 102 as if a user were accessing the application directly through server computing device 102 and not remotely through client computing devices 106. It is to be understood that access may be provided for a definite number of applications, or for all applications hosted on server computing device 102.

Applications and services hosted on server computing device 102 are accessible by client computing devices 106 by remoting the desktop through one or more protocols, for example, remote desktop protocol (RDP). The use of such protocols can be implemented in the context of a remote client access system such as Terminal Services™ system.

Client computing devices 106 can be coupled to each other or to server computing device 102 in various combinations through a wired and/or wireless network, including a LAN, WAN, or any other networking technology known in the art.

Server computing device 102 and client computing devices 106 may be implemented with an operating system supporting applications based on WPF. For example, client computing devices 106 may be provided with operating systems that include, but are not limited to, Windows® Vista™ operating system by the Microsoft® Corporation.

Server computing device 102 also includes a redirection agent 108. Redirection agent 108 is capable of instrumenting the remoting of applications hosted on server computing device 102 to client computing devices 106. To implement this, redirection agent 108 collects and transfers structural information associated with desktop of server computing device 102 and renders visual content associated with the desktop of server computing device 102 in accordance with the structural information.

Figure 2:
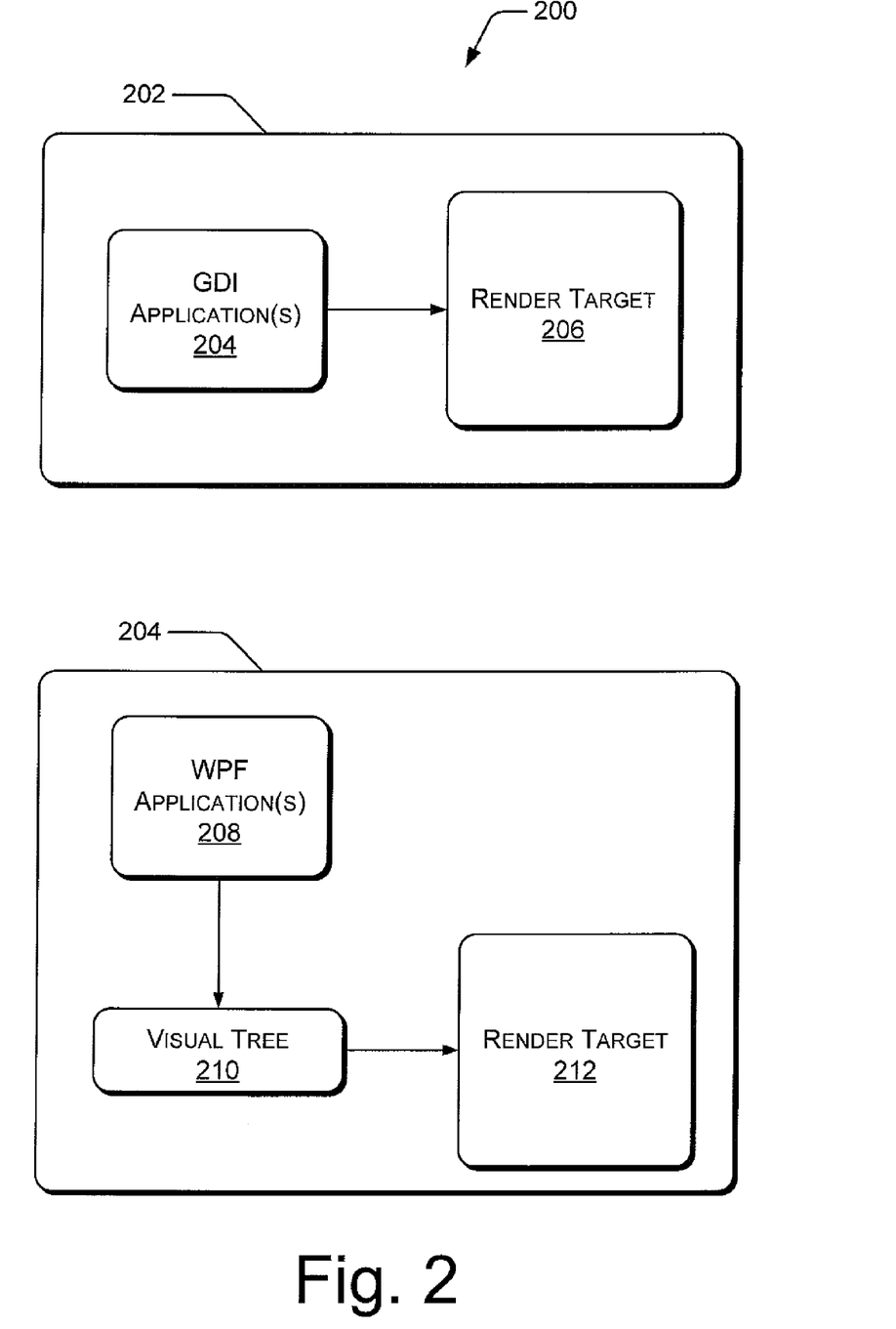
FIG. 2 illustrates rendering of visual content onto a render target for GDI and WPF applications.

FIG. 2 illustrates the manner in which various types of computer based applications (e.g., GDI applications or WPF applications) render their associated visual content on a desktop of a computing-based device. Generally, a user can interact with an application through an interface (e.g., a Windows® interface). Data generated as a result of the execution of such applications is visible in a Window® interface associated with the application.

Block 202 illustrates the rendering of the visual content associated with GDI application(s) 204 onto a render target 206. A render target may be defined as a region where all rasterized and rendered pixels are placed. A frame buffer is an example of a render target. GDI application(s) 204 generally render their visual content in an immediate drawing mode. In such a case, GDI application(s) 204 direct their output straight to render target 206, for example a frame buffer. Hence each time a drawing or a visual representation is created by GDI application(s) 204 it is directly rendered onto the frame buffer. In case some changes occur in GDI application(s) 204, their entire visual content is again re-rendered onto the frame buffer. It would be understood that GDI application(s) 204 rasterize and render the visual content to be displayed thereby making no logical distinction between describing the drawing operation and executing via rasterization and rendering processes the drawing.

Block 204 illustrates the rendering of visual content associated with WPF application(s) 208. Rendering visual content in WPF application(s) 208 may differ from rendering in GDI application(s) 204, because unlike GDI application(s) 204, the visual contents of a WPF application(s) 208 that are to be displayed, are not rendered directly to a frame buffer. In the case of WPF application(s) 208, the associated visual contents are stored separately in, for example, a storage buffer. The visual contents can be generated by a rasterizing module.

For example, in Windows® Vista™ operating system, the visual content is stored as a structural representation referred to as visual tree 210. Visual tree 210 has core visual content and related information, as represented by nodes. The nodes may specify attributes like spatial placement, size of the application window, drawing resources and drawing instruction, etc.

A display execution module responsible for displaying WPF application(s) 208 content, selects portions of the visual tree for display onto render target 212 (e.g., a frame buffer). The display execution module can be a WPF rendering thread. For rendering the visual contents in conformance with visual tree 210, the WPF rendering thread traverses all nodes of visual tree 210 and rendering visual content in conformance with visual tree 210. For any changes made by the executing applications there are corresponding changes to nodes of visual tree 210. The WPF rendering thread can also note changes to visual tree 210 and re-renders portions that are specific to the changes affected by the executing applications.

It is to be noted that the manner in which a desktop is accessed remotely, may differ from the remote accessing of applications. For example, in the case a desktop is accessed remotely, a visual tree corresponding to the desktop may be created first. This is followed by creation of visual trees corresponding to one or more applications that may be running on the desktop. Subsequently, all the visual trees are associated as child nodes to a root node. This visual tree with the associated desktop and application related information is then composed and the visual content is rendered. As discussed previously, a visual tree may denote only a structural, and not the visual representation of the desktop. Therefore, it can be gathered that generation of a visual tree separates the visual representation from the structural character of the visual contents of the desktop.

Generally, the process of composition of a desktop begins with specifying a relationship between one or more visual elements for such as specifying z-order of windows, relative placement of windows, degree of transparency, and so on. Accordingly, a visual tree is generated which is a structural representation of the visual elements in consideration. The visual elements form one or more nodes of the visual tree. Subsequently, a display execution module associates potential attributes (e.g., effects, transformations, etc.) with the visual elements and creates a point-in-time view of the visual tree. In case of operating systems like Windows® Vista™ operating system by the Microsoft® Corporation, composition may be managed by an operating system component referred to as a Desktop Windows® Manager (DWM).

Figure 3:
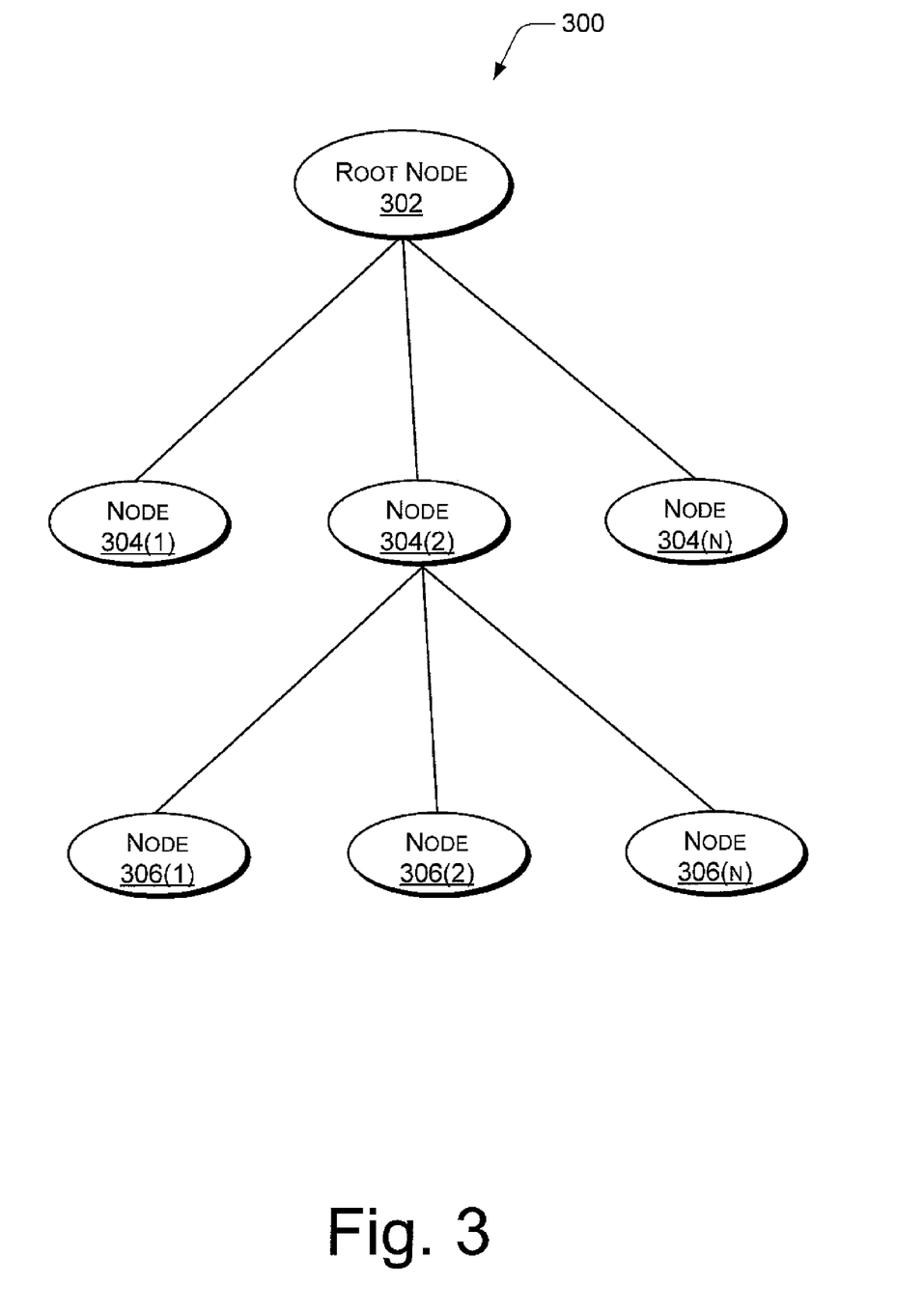
FIG. 3 illustrates an exemplary visual tree.

FIG. 3 illustrates an exemplary visual tree 300. Visual tree 300 includes root node 302 as the parent or the root node for the structure. Visual tree 300 further includes one or more child nodes 304(1)-(N). Of the number of child nodes illustrated, one child node, node 304(1), represents a desktop. The remaining nodes 304(2)-(N) are the respective structural representations or visual trees for one or more applications that may be running on the desktop to which visual tree 300 corresponds. In certain implementation, one or more nodes 304(2)-(N) can be parent nodes for other child nodes. For example, as illustrated node 304-(2) is a parent node for one or more child nodes 306(1)-N). Furthermore, child nodes 306(1)-(N) can additionally provide attributes that define nodes 304(2)-(N) and in turn the structural representation of associated applications. Examples of such attributes include, but are not limited to, ordering of windows, clipping, etc.

Figure 4:
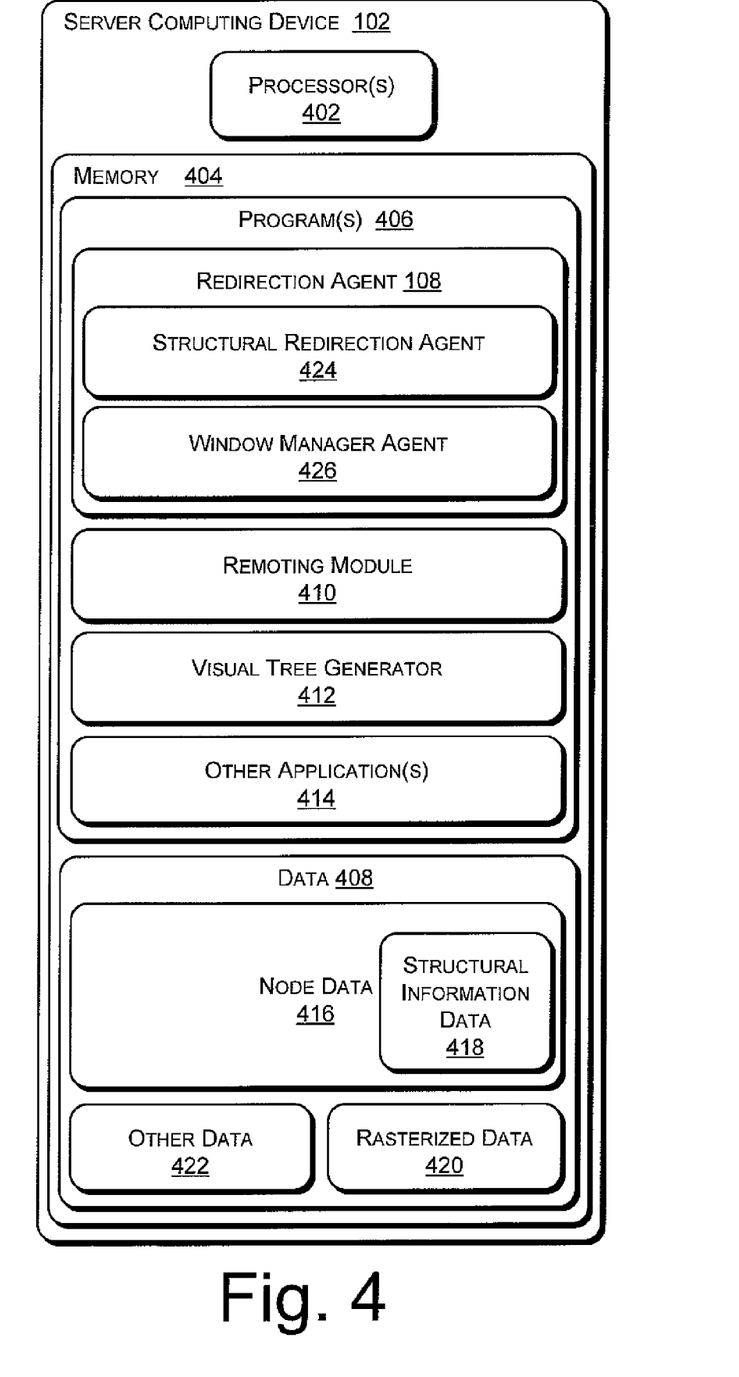
FIG. 4 illustrates an exemplary server based device.

FIG. 4 illustrates relevant exemplary components of server computing device 102. Server computing device 102 can include one or more processor(s) 402 and a memory 404. Processor(s) 402 may include microprocessors, microcomputers, microcontrollers, digital signal processors, central processing units, state machines, logic circuitries, and/or any devices that manipulate signals based on operational instructions. Among other capabilities, processor(s) 402 are configured to fetch and execute computer-readable instructions stored in memory 404.

Memory 404 can include any computer-readable medium known in the art including, for example, volatile memory (e.g., RAM) and/or non-volatile memory (e.g., flash, etc.). As illustrated in FIG. 4, memory 404 also can include program(s) 406 and data 408. Program(s) 406 include, for example, redirection agent 108, remoting module 410, visual tree generator 412 and other application(s) 414. Other application(s) 414 include programs that supplement applications on any computing based device such as word processor applications, spreadsheet applications, and such. In one implementation, other application(s) 414 include a rasterizing module.

Data 408 include, for example, node data 416, structural information data 418, rasterized data 420, and other data 422. Node data 416 stores information in relation to the one or more child nodes for example child nodes 304(1)-(N). As indicated previously, child nodes, in one implementation, correspond to one or more applications that are running on a desktop. Redirection agent 108 further includes a structural redirection agent 424 and Windows® manager redirection agent 426.

In one implementation, node data 416 includes the structural information data 418 regarding the relationship and the location of render targets of WPF application with regard of the desktop.

Figure 5:
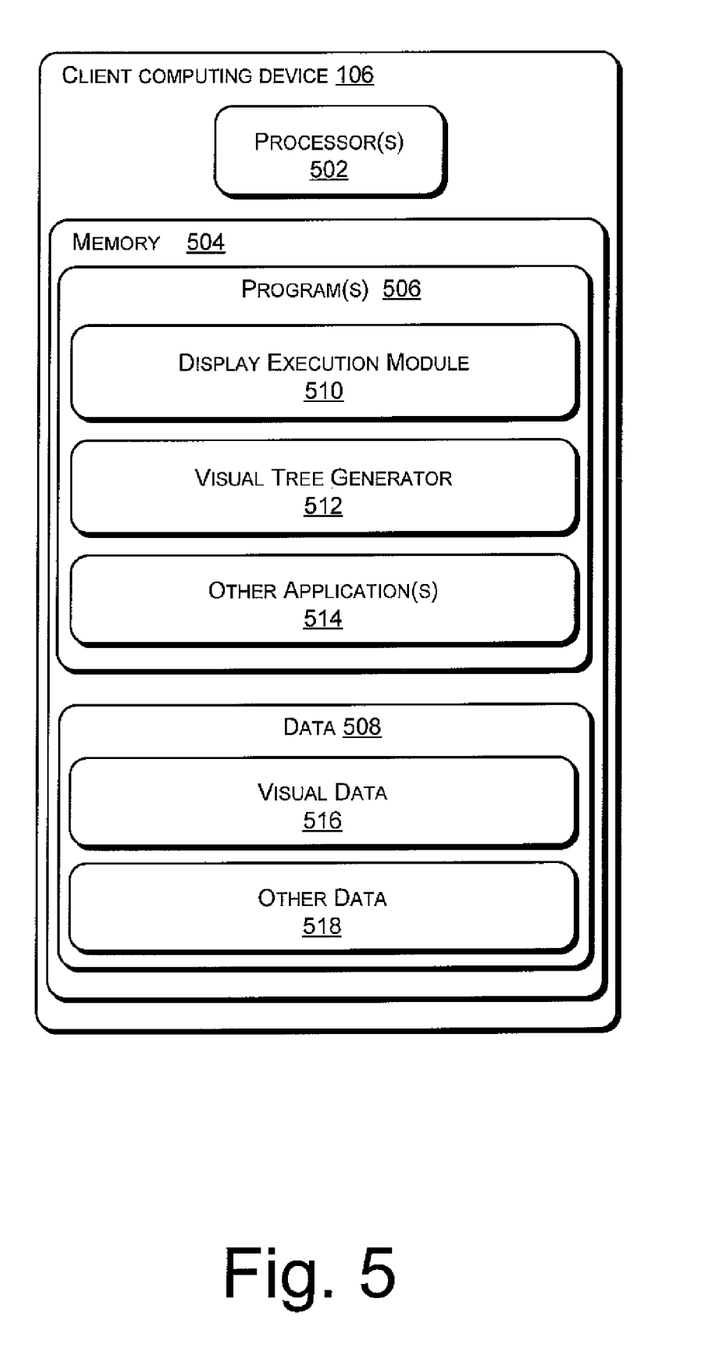
FIG. 5 illustrates interactions between various components for remoting applications based on Windows Presentation Foundation in a non-composed desktop.

FIG. 5 illustrates relevant exemplary components of client computing devices 106. In one implementation, client computing devices 106 includes one or more processor(s) 502 and a memory 504. Processor(s) 502 include, for example, microprocessors, microcomputers, microcontrollers, digital signal processors, central processing units, state machines, logic circuitries, and/or any devices that manipulate signals based on operational instructions. Among other capabilities, processor(s) 502 are configured to fetch and execute computer-readable instructions stored in memory 504.

Memory 504 can include any computer-readable medium known in the art including, for example, volatile memory (e.g., RAM) and/or non-volatile memory (e.g., flash, etc.). As illustrated in FIG. 5, memory 504 also can include program(s) 506 and data 508. Program(s) 506 include, for example, display execution module 510, visual tree generator 512 and other application(s) 514. Other application(s) 514 include programs that supplement applications such as word processor applications, spreadsheet applications, and such. In one implementation, other application(s) 514 include a rasterizing module. Data 508 include, as an example, visual data 516 and other data 518.

Remoting of desktops and applications running therefrom is implemented through a redirection agent 108. Redirection agent 108 affects the transfer of structural information and structural representation associated with desktop at server computing device 102 and renders it at client end (e.g., client computing devices 106).

As indicated previously one or more applications are hosted on server computing device 102. Users of one or more of the client computing devices 106 may request for initiation of a remote session to server computing device 102 for accessing application. In one implementation, a remote session between server computing device 102 and one or more of client computing devices 106 is initiated by remoting module 410.

In the initial stages of the remote session, server computing device 102 operates without any structural representation (e.g., a visual tree), of the applications being remoted. In such a scenario rendering of all graphics from the one or more applications on server computing device 102 is targeted in a single immediate drawing mode visible surface. In one implementation the visible surface may be the frame buffer.

When a WPF application (e.g., WPF applications 208) is created, graphics system of server computing device 102 transitions into a new drawing mode called "structural redirection" mode. In an implementation, structural redirection mode is implemented through structural redirection agent 422. Structural redirection agent 422 maintains a single immediate-mode visible surface with one or more visual trees. The visual trees are created by visual tree generator 412 and controlled by the corresponding one or more WPF application(s) 208. As indicted earlier, visual trees include structural information that defines various relationships (e.g., z-order of application windows between one or more visual elements). In an implementation, the structural information is stored in structural information data 418 inside node data 416.

Window manager agent 426 sends structural information to structural redirection agent 424. The structural redirection agent 424 collects and transfers node data 416 to the visual tree generator 512 at the client end. The visual tree maintained by the structural redirection agent 424 encompasses the whole desktop. In one implementation, node data 416 originating from a windows manager is transferred from the structural redirection layer agent 424 to the visual tree generator 512 at the client end. It is to be noted that at this stage, processing capabilities may exclusively be used for maintaining the visual tree and performing any other drawing operation for areas of the desktop not covered by the visual trees. The desktop with the constituent applications are in a non-composed state, since no composition process happens at the remote end. It also to be noted that at this stage, no rasterizion happens at the remote end for any structural representation or visual trees, Once node data 416 (originated in the window manager agent 426) is collected by structural redirection agent 424, it is sent to the remote display client. The structural redirection agent 424 instructs a remote display client (e.g., client computing devices 106), to recreate a visual tree at the client end (i.e., at the client computing devices 106), corresponding to node data 416. In one implementation, the visual tree at client computing devices 106 is generated by visual tree generator 512. The visual tree created would have a child tree as a representation of the desktop being remoted and as many other children trees as there are WPF application(s) 208 being executed by a user through the desktop. In another implementation, the visual tree generated by visual tree generator 512 is stored in other data 518.

One or more GDI application(s) 204 may also be remoted from server computing device 102, along with WPF application(s) 208. In such a case, one child node of root node of the visual tree is associated with content to be displayed by all GDI application(s) 204 and as many other children trees as there are WPF application(s) 208 being executed by user or client. In an implementation, visual content associated with one or more GDI application(s) 204 is stored in rasterized data 416.

Upon creation of visual tree at the client end, for example client computing devices 106, display execution module 510 of client computing devices 106 renders the visual content in accordance with the visual tree. The rendered visual content is stored in visual data 516. In this manner, desktop is remoted without rendering and composing the desktop at server computing device 102. Display execution module 510 can be a render thread in the Media Infrastructure Layer in client computing devices 106, having Microsoft® Vista™ operating system.

Exemplary Method(s)

Figure 6:
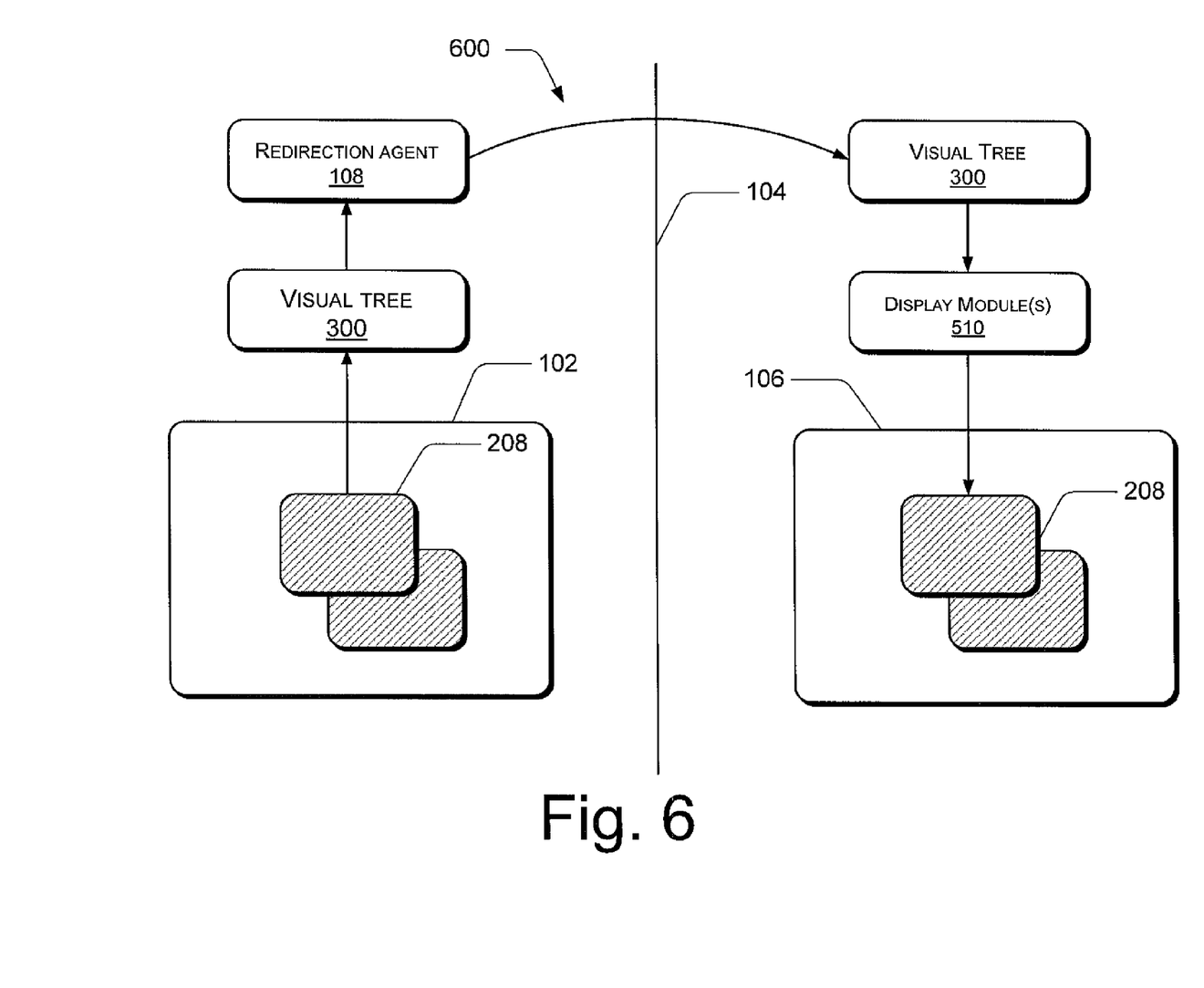
FIGS. 6 and 7 illustrate exemplary methods for remoting WPF based applications in a non-composed desktop.

Exemplary methods for remoting WPF based application in a non-composed desktop are described with reference to FIGS. 1 to 5 and more specifically to FIG. 6. FIG. 6 illustrates interactions that occur between server computing device 102 and one or more client computing devices 106 that seek to access applications hosted on server computing device 102.

These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 7:
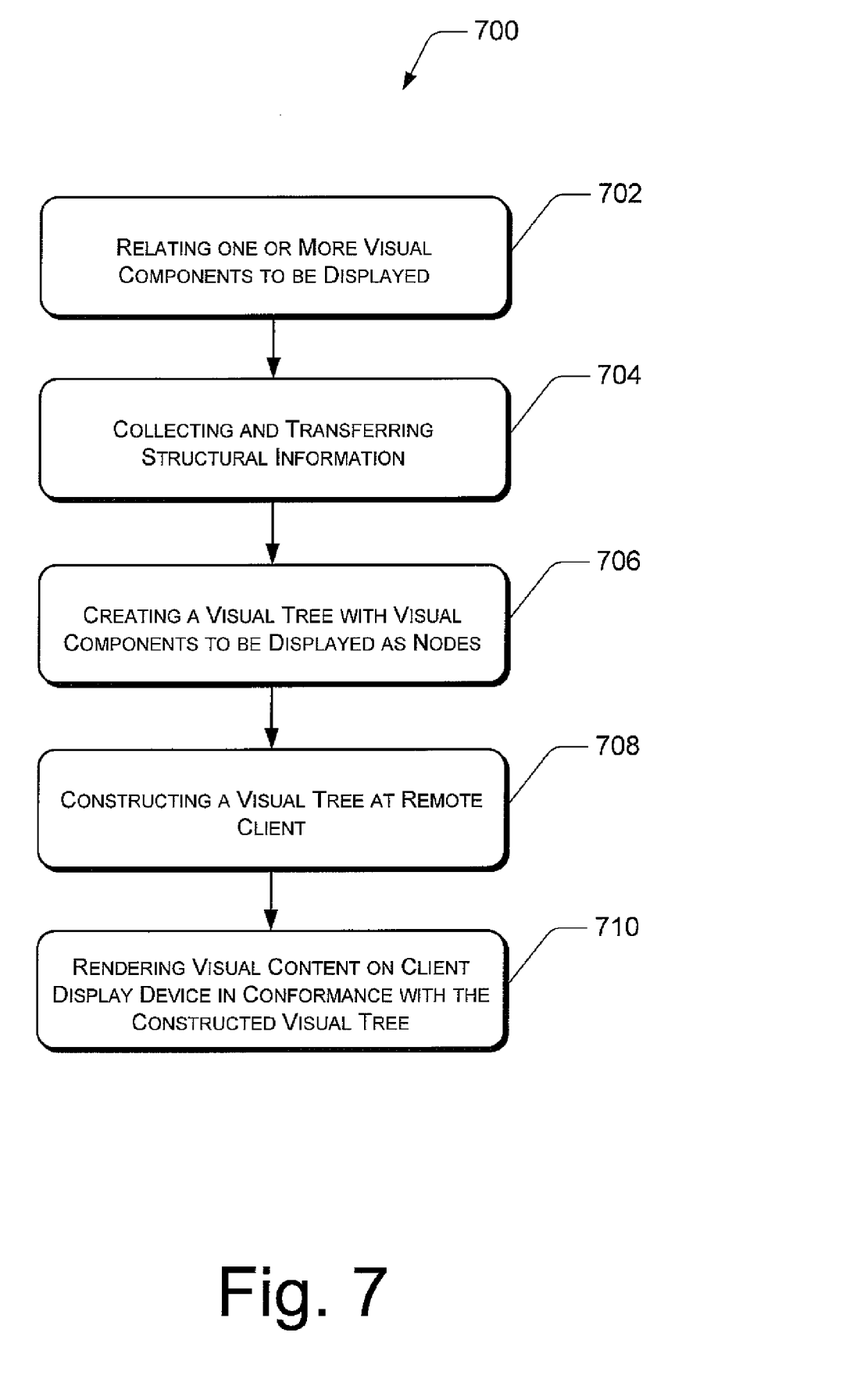

FIG. 7 illustrates an exemplary method 700 implementing software protection using overlapping code on a computing-based device. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 702, one or more visual components on a desktop are related to each other. For example, the visual components correspond to the visual output (e.g., Windows® interface), generated by one or more applications that may be running on server computing device 102. In one implementation, relationship between the visual components can be z-order of windows to be displayed, relative placement, transparency, etc.

At block 704, when the first WPF application has started, the structural information data for the set of all applications running in the desktop is collected and sent to the visual tree generator 512. For example, structural information associated with the visual tree is collected. In an implementation, structural redirection agent 422 collects structural information data 421 or node data 416, associated with the visual tree from the window manager agent. In one implementation, transferred node data 416 is managed by visual tree generator 512 at the client end. It would be noted that at this stage, processing may be done only to maintain the visual tree. The desktop with the constituent applications are represented in a structural form and hence are in a non-composed state.

At block 706, a visual tree is created with the visual components as the nodes. As discussed above, a visual tree is a structural representation of the visual components to be displayed. For example, when a remote session is being initiated, server computing device 102 operates without any visual tree associated with the applications being remoted. In such a scenario rendering of all graphics from the one or more applications on server computing device 102 is targeted in a single immediate-mode visible surface.

When a WPF application, for example WPF application(s) 208, is initiated at server computing device 102, its graphics system transitions into a structural-redirection mode, implemented through structural redirection agent 422. Structural redirection agent 422 maintains a single immediate-mode visible surface with one or more visual trees, for example visual tree 300.

At block 708, a visual tree is constructed at the remote client end. For example, Structural redirection agent 422 develops node data 416 associated with the visual tree, and instructs visual tree generator 512 in one or more of client computing devices 106 to recreate a visual tree. The visual tree created by visual tree generator 512 corresponds to the transferred node data 416. The visual tree created would have a child tree node representing the desktop being remoted and as many other children tree nodes as there are WPF application(s) 208 being executed by a user on server computing device 102.

At block 710, visual content is rendered on remote client end in conformance with the constructed visual tree. For example, once the visual tree is created, display execution module 510 of client computing devices 106 renders the visual contents as per the visual tree. In one implementation, display execution module 510 is a render thread in the Media Infrastructure Layer component of Microsoft® Vista and similar operating systems.

Furthermore, one or more GDI application(s) 204 may also be remoted from server computing device 102, along with WPF application(s) 208. In such a case, one child node of root node of visual tree is associated with content to be displayed by GDI all application(s) 204 and as many other children trees as there are WPF application(s) 208 being executed by user or client. The visual content associated with GDI application(s) 204, are rendered in a GDI application(s) 204 immediate drawing mode and WPF application(s) 208 are rendered in the manner as exemplified above.

CONCLUSION

Although embodiments for remoting WPF based applications in a non-composed desktop, have been described in language specific to structural features and/or methods, it is to be understood that the subject of the appended claims is not necessarily limited to the specific features or methods described. Rather, the specific features and methods are disclosed as exemplary implementations of software protection using code overlapping.

What is claimed is:

1. A server computing device comprising:
 a memory;
 one or more processors operatively coupled to the memory;
 a redirection agent in the memory, wherein the redirection agent executable by the one or more processors to remote remotes one or more desktops and applications of the server computing device; and
 a structural redirection agent that is executable by the one or more processors to:
  render graphics from the one or more desktops and applications on a single drawing surface, in an immediate rendering mode;
  in response to a creation of a presentation framework application, transition from the immediate rendering mode to a retained rendering mode;

maintain a first visual tree that includes structural information associated with visual elements of the one or more desktops and applications;

store the structural information in node data;

transfer the node data to a visual tree generator that is executing at a remote client; and instruct the visual tree generator to generate at the remote client a second visual tree from the transferred node data, and therewith display the applications at the remote client without rendering contents of the one or more applications and desktop.

2. The server computing device of claim 1, wherein graphics device interface (GDI) applications are remoted with the presentation framework application and wherein a child node of a root node of the first and second visual tree is associated with content to be displayed by the GDI applications.

3. The server computing device of claim 2, wherein visual content associated with the GDI applications is stored as rasterized data in the server computing device prior to being sent to the remote client.

4. The server computing device of claim 1, wherein the visual tree generator creates visual trees that correspond to the applications, the visual trees used to display the applications at the remote client.

5. The server computing device of claim 4, wherein the visual trees include a child tree as a representation of a desktop and corresponding child trees of presentation framework applications, that are remoted to one or more client computing devices.

6. The server computing device of claim 1, further comprising a window manager agent that provides structural information to the structural redirection agent to generate structural information node data.

7. The server computing device of claim 6, wherein the structural redirection agent maintains a visual tree for the whole desktop and instructs a remote display client to create a visual tree.

8. A method comprising:

rendering graphics of a desktop and applications executing at a server on a single drawing surface, in an immediate rendering mode, the immediate rendering mode comprising a frame buffer;

transitioning from the immediate rendering mode to a retained rendering mode in response to determining a creation of a presentation framework application;

identifying relationships between one or more visual components of the desktop and the applications executing at the server, the one or more visual components to be displayed at a remote client;

creating a first visual tree in which the visual components are represented as nodes of the first visual tree;

collecting structural information associated with the first visual tree; and transferring the structural information via a management redirection layer from the server to the remote client to enable the remote client to construct a second visual tree based on the structural information, and display the applications without rendering contents of the applications.

9. The method of claim 8, wherein the relationships include at least one of relating includes one or more of: a z-order of windows to be displayed, a relative placement of the windows, and a transparency associated with each of the windows.

10. The method of claim 8, wherein the creating the visual tree is performed without association of visual trees to applications that are remoted.

11. The method of claim 8, wherein the collecting involves processing exclusively to maintain the first visual tree.

12. The method of claim 8, wherein the second visual tree corresponds to transferred node data.

13. The method of claim 8, wherein GDI applications and the presentation framework application are represented by the visual components.

14. The method of claim 8 further comprising maintaining the immediate rendering mode visible surface after the presentation framework application is created.

15. The method of claim 8 further comprising rendering visual content at the remote client device from the visual tree.

* * * * *